(12) United States Patent
Pearl et al.

(10) Patent No.: US 6,370,969 B1
(45) Date of Patent: Apr. 16, 2002

(54) INERTIA-TESTING METHOD AND SYSTEM

(75) Inventors: Kevin A. Pearl, Manchester; Joseph R. Vivirito, South Windsor, both of CT (US); Richard Kuchta, Shickshinny, PA (US)

(73) Assignee: Gerber Technology, Inc., Tolland, CT (US)

( * ) Notice: Subject to any disclaimer, the term of this patent is extended or adjusted under 35 U.S.C. 154(b) by 0 days.

(21) Appl. No.: 09/433,480

(22) Filed: Nov. 4, 1999

(51) Int. Cl.[7] .................................................. G01L 5/00
(52) U.S. Cl. .................................. 73/862.391; 73/117.2
(58) Field of Search .............................. 73/116, 117.2, 73/117.3, 118.1, 119 R, 862.381, 862.391, 862.42

(56) References Cited

U.S. PATENT DOCUMENTS

| | | | |
|---|---|---|---|
| 3,795,131 A | | 3/1974 | Wade et al. |
| 3,839,908 A | * | 10/1974 | Casper |
| 4,036,049 A | | 7/1977 | Hanson |
| 4,137,759 A | * | 2/1979 | Talbert |
| 4,372,172 A | * | 2/1983 | Gombocz ................ 73/862.39 |
| 4,480,487 A | * | 11/1984 | Kunzfeld ................ 73/862.45 |
| 4,731,044 A | * | 3/1988 | Mott ........................ 73/862.49 |
| 4,802,883 A | * | 2/1989 | Tominaga et al. |
| 4,860,597 A | * | 8/1989 | Fenech .................... 73/862.45 |
| 4,928,538 A | * | 5/1990 | Burdess et al. .......... 73/862.41 |
| 5,368,375 A | * | 11/1994 | Gustafsun |
| 5,483,841 A | | 1/1996 | Casada |
| 5,517,863 A | * | 5/1996 | Sodermalm .............. 73/862.42 |
| 5,698,796 A | * | 12/1997 | Hirano ..................... 73/862.41 |
| 5,733,214 A | * | 3/1998 | Shiki et al. |
| 5,782,709 A | * | 7/1998 | Greimann |
| 5,877,431 A | * | 3/1999 | Hirano ..................... 73/862.41 |
| 5,959,220 A | * | 9/1999 | Jun ........................ 73/862.391 |

FOREIGN PATENT DOCUMENTS

| | | |
|---|---|---|
| DE | 2812545 | 10/1979 |
| DE | 3105331 | 9/1982 |
| EP | 0086433 | 8/1983 |
| FR | 891072 | 11/1942 |
| WO | WO 98/39626 | 9/1998 |

OTHER PUBLICATIONS

European Search Report, Feb. 12, 2001.

* cited by examiner

Primary Examiner—Eric S. McCall
(74) Attorney, Agent, or Firm—McCormick, Paulding & Huber LLP

(57) ABSTRACT

In a method of inertia-testing movable machine components, a machine motor is powered to impart constant motion on various components. The power supply to the motor is then cut, causing the moving components of the machine to continue moving, due to inertia or angular momentum, until a resting state is achieved. The time required to reach a resting state is measured and recorded for comparison to predetermined data indicative of a normally operating machine. If the time required to achieve a resting state varies from the predetermined data by a substantial amount, it may be indicative of a damaged, worn or maladjusted component.

21 Claims, 2 Drawing Sheets

US 6,370,969 B1

INERTIA-TESTING METHOD AND SYSTEM

TECHNICAL FIELD

The present invention relates to methods and systems for testing machinery and, more particularly, to a method and system for inertia-testing of moving parts of a powered machine.

BACKGROUND AND SUMMARY OF THE INVENTION

Motor-driven machinery having moving parts subject to wear, damage or maladjustment requires monitoring or periodic testing and correction or compensation. In some circumstances, automatic monitoring and compensation systems are utilized. In other instances, periodic testing and repair or replacement of worn or damaged parts is undertaken. Both methods of addressing wear, damage or maladjustment have shortcomings. In addition, both methods are not always undertaken by machine owners or operators until damaged or worn components adversely affect productivity or, in some instances, damage a machine.

Automatic monitoring and compensation systems are generally complex and costly, and are often limited to one or a few components. An automatic monitoring and compensation system may involve, for example, measurement of the rate of operation of a particular component which, when operating below a predetermined standard, may be provided with corrective elements such as increased driving power or additional lubrication to selected components. Such compensation, however, may not necessarily remedy the cause of the problem and may merely delay inoperability while wear or damage conditions continue to accumulate. Further, it is possible that continued operation under such conditions will damage additional machine components. For instance, a worn out bearing or an over-tightened drive belt may cause excessive friction between moving components which, in turn, may cause premature wear or damage to drive components, increasingly excessive energy consumption, or overheating. In addition to the foregoing shortcomings, automatic monitoring and compensation systems can be costly and technically complex.

Periodic testing of machinery and machine components often requires costly and technically complex procedures. It may often require substantial down-time from production if, for example, it is necessary to disassemble a machine to test one or more particular components. Further, it is sometimes difficult to re-create operating conditions when testing a component separately.

The present invention is directed to a novel method and system for obtaining and comparing benchmark data that is unique to and characteristic of a particular system in which an adjustable belt is implemented. Typical prior art systems that provide means for measuring performance data and comparing the same to pre-stored data are usually confined to one or a few components that make up a larger system. They cannot test a whole system. Thus, there is no consideration given to additional components or loading and their effect on the component for which data is being compared. Thus, for example, such known systems as a tension roller and sensor for in-operation belt tension adjustment may detect and correct belt tension without detecting excessive belt-pulley friction or excessive loading. The present invention method and system, however, establish a performance benchmark by initiating a test when all components, including a drive belt, have been initially adjusted. This allows further testing after a drive belt has been properly adjusted or replaced in order to determine if correcting belt tension cured the overall problem or if additional components need to be checked. By testing overall system performance in conjunction with testing for improper belt tension, problems with additional components can be detected and cured before they lead to further damage or wear.

It is desirable, therefore, to provide a method and system for efficiently and accurately testing one or more components of a machine.

According to a first aspect of the present invention, a machine motor is powered to impart constant motion on various components. The power supply to the motor is then cut, causing the moving components of the machine to continue moving, due to inertia or angular momentum, until a resting state is achieved. The time required to reach a resting state is measured and recorded for comparison to predetermined data indicative of a normally operating machine. If the time required to achieve a resting state varies from the predetermined data by a substantial amount, it may be indicative of a damaged, worn or maladjusted component.

A second aspect of the invention is directed to a system, including a controller, data storage, and signaling means designed to operate according to the method described above.

Yet another aspect of the invention is directed to application of the aforementioned method and system to a machine-driven, continuous belt.

These objects and other inherent advantages are achieved by the present invention.

DESCRIPTION OF THE PREFERRED EMBODIMENTS

The present invention method and system for inertia-testing of moving parts of a powered machine is described with respect to its application to a system for detecting proper belt tension for a machine-driven, continuous belt. The invention is not limited to such, and has application to analogous machine-driven systems.

Figure 1:
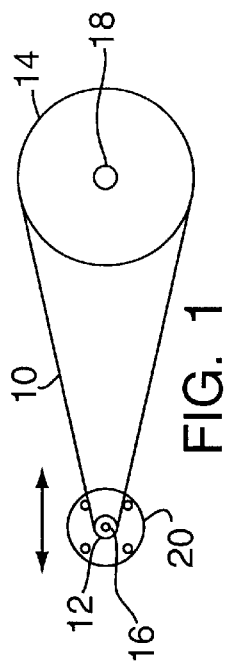
FIG. 1 is a schematic diagram of a machine-driven, continuous belt mounted for rotation of a set of pulleys.
Figure 2:
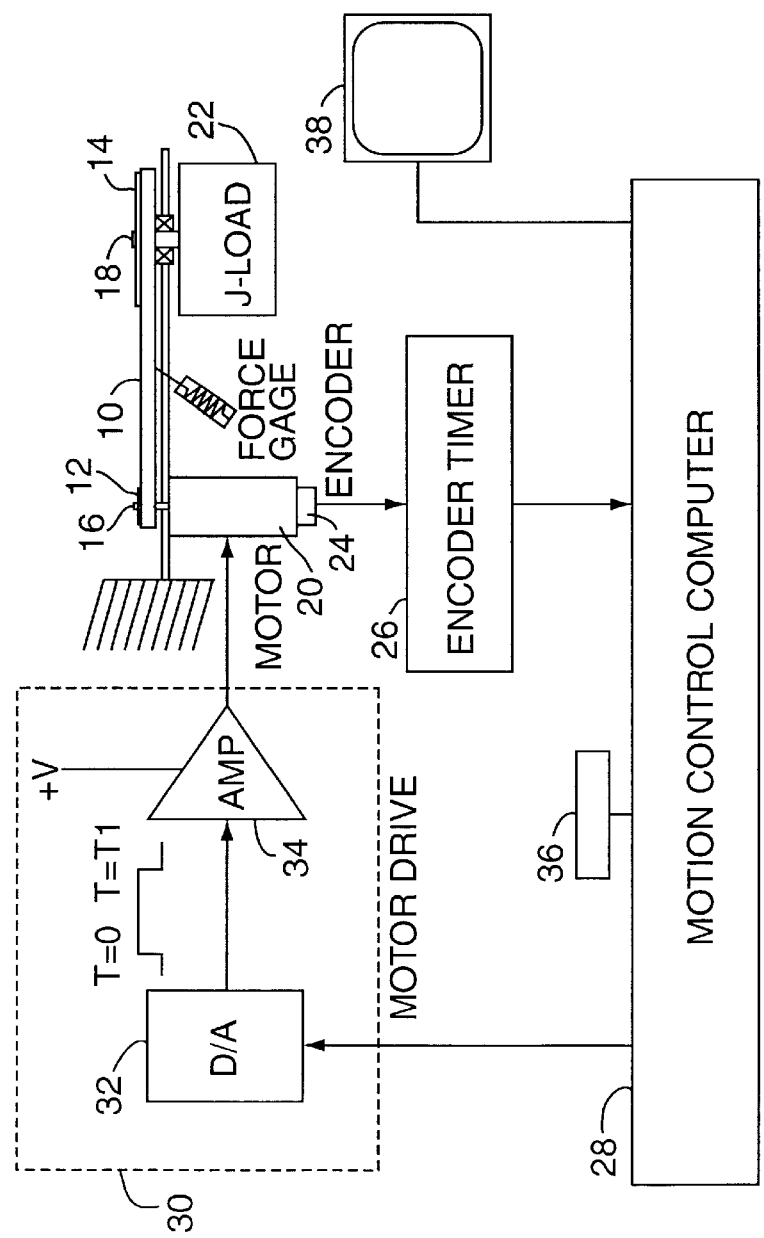
FIG. 2 is a schematic diagram of a first embodiment of a system according to the present invention.

Referring to FIGS. 1–2, a machine-driven belt (10) is mounted to a first pulley (12) and a second pulley (14). Each pulley (12, 14) is adapted to rotate about a central axis, drive shaft (16) and shaft (18), respectively. A motor (20) for imparting rotational force to drive the first pulley (12) is provided. The drive shaft (16) of the first pulley (12) is adjustable relative to the second pulley (14) in order to provide means for adjusting the tension of the belt (10). Adjustment is made by positioning the first pulley (12) closer to or further from the second pulley (14) along a linear path. Other conventional means for adjusting the belt (10) may be implemented, such as an idler-roller type belt tensioner (not shown) positioned intermediately between the first and second pulleys (12, 14) and in engagement with the belt (10). Depending on its particular application, the belt (10) may be applied to drive one or more mechanisms or to carry one or more loads in conveyor fashion. For the purpose of discussing the present invention, a load driven by the belt (10) is represented by the inertia component (22) in FIG. 2.

In accordance with the present invention, the system requires means for measuring motion of a driven component after driving power has been cut off. Thus, an encoder (24) and encoder timer (26) are provided to measure rotational movement of the rotational drive shaft driven pulley (12) fixed to the motor (20). The encoder (24) and encoder timer (26) are interfaced with a controller (28). The controller (28) may be interfaced with, or may be one and the same with, a control system (30) for controlling other functions associated with the system including motor timing control. The motor drive system (30) includes a digital-to-analog (D/A) converter (32) and an amplifier (34).

A method according to the present invention for inertia-testing a machine such as the system described with respect to FIGS. 1–2 is now described in the context of testing for proper belt tension.

First, the tension of the belt (10) is set using a conventional force gage. Using the controller (28), an operator invokes a diagnostic program. The controller (28) issues a driving signal via the motor drive system (30) to the motor (20) causing the motor (20) to accelerate to a predetermined, fixed velocity. When the motor (20) achieves the predetermined velocity, a timer (36) associated with the controller (28) is activated to measure a time interval for a predetermined amount of time, such as T seconds. At the end of T seconds, the controller (28) shuts off the driving signal to cause the velocity to go to zero. Simultaneously, the controller (28) starts an interval timer and accumulates encoder counts during the time interval. The encoder (24) and encoder timer (26) measure the time and revolutions that occur between the time of shutting off the driving signal and the time that the velocity reaches zero.

When the velocity reaches zero, the encoder (26) output will stop changing. The encoder count is stored, indicative of the number of revolutions of the rotatable shaft (18) of the motor (20). The encoder interval timer (26) measures the time required for the rotatable shaft (18) to stop. The encoder (24) and encoder timer (26) can be programmed to run for an additional time such as, for example, 100 milliseconds to ensure that rotational motion has completely stopped. The encoder readings are stored as representative of the time and number of cycles required for the motor shaft (18) to come to rest when the motor power has been shut off, under proper belt tension conditions. Preferably, the aforementioned procedure is repeated without changing the belt tension, perhaps five times, and an average is taken to represent the proper belt tension encoder data, referred to as the baseline data. This data is then stored and saved as a baseline for future comparison.

At periodic intervals, or whenever belt-tension testing is desired, the above described procedure is repeated on the system. If the belt tension or friction between the belt (10) and one of the pulleys (12, 14) has changed since initial set up and storing of the baseline data, the time measured by the encoder timer (26) will change from the baseline time measurement. The controller (180 can be programmed to signal an operator, through a visual signal on a display (38) or by other means, when a timed value is greater than or less than the baseline timed value.

The aforementioned inertia-testing method can be selectively run alone and on demand or, if desired, as part of a diagnostic routine can be programmed on the controller.

While the aforementioned routine is directed to belt-tension testing, a resulting timed value that is greater or less than the baseline value may be indicative of problems other than improper belt tension. For example, if a timed value varies from the baseline value and a subsequent measuring of belt tension reveals that the belt tension is adjusted properly, it is likely that another component may be out of adjustment or may be damaged, worn, or in need of lubrication. For instance, a worn or contaminated bearing surface or a slipping drive component may be the cause of a deviating timed value. Thus, a progressive sequence of incrementally checking individual components, and correspondingly re-testing according to the present invention method, enables precise identification of a problem associated with one or more of multiple components. This approach works equally well with compound systems, such as the compound system (100) described with respect to FIG. 3.

Figure 3:
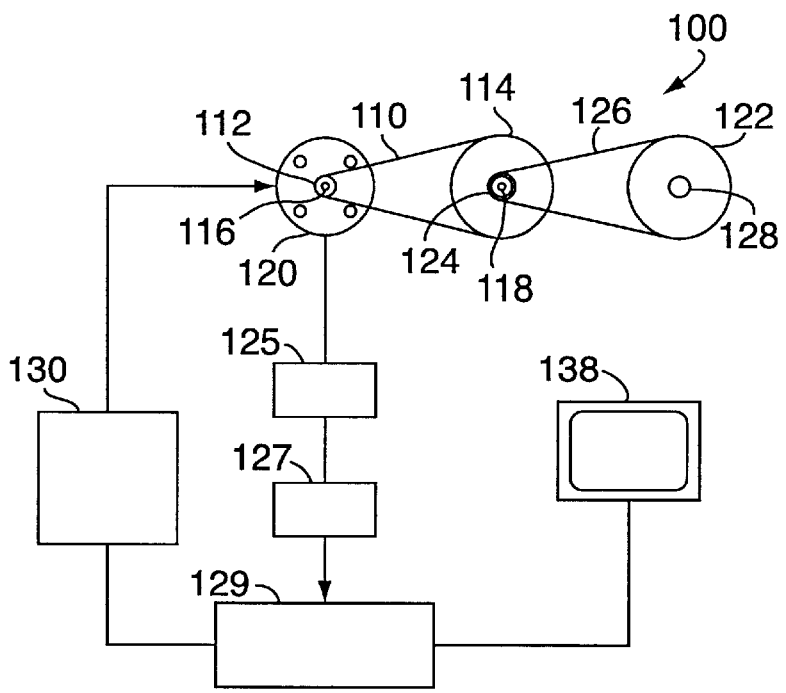
FIG. 3 is a schematic diagram of a second embodiment of a system according to the present invention.

Referring to FIG. 3, a first machine-driven belt (110) is mounted to a first pulley (112) and a second pulley (114). Each pulley (112, 114) is adapted to rotate about a drive shaft (116) and shaft (118), respectively. A motor (120) for imparting rotational force to drive the first pulley (112) is provided. The axis of rotation of rotation (116) of the first pulley (112) is adjustable relative to the second pulley (114) in order to provide means for adjusting the tension of the first belt (110). Adjustment is made by positioning the first pulley (112) closer to or further from the second pulley (114) along a linear path. Other conventional means for adjusting the first belt (110) may be implemented, such as an idler-pulley type belt tensioner (not shown) positioned intermediately between the first and second pulleys (112, 114) and in engagement with the first belt (110). The second pulley (114) is provided with an associated drive ring (124) for engaging a second belt (126) to drive a third pulley (122). The second belt (126) may be adjustable by moving the shaft (128) of the third pulley (122) closer to the rotational axis (118) of the second pulley, or by other conventional means such as an idler-roller type tensioner (not shown).

In a manner similar to that described with respect to the embodiment of FIGS. 1–2, an encoder (125) and encoder timer (127) are provided to measure rotational movement of the drive shaft (116) of the motor (120). The encoder (125) and encoder timer (127) are interfaced with a controller (129). The controller (129) may be interfaced with, or may be one and the same with, a control system (130) for controlling other functions associated with the system including motor timing control. A display monitor (138) may be provided.

For the system illustrated in FIG. 3, time values varying from the baseline data pursuant to execution of the method described with respect to FIGS. 1–2 will not precisely distinguish where the loss is occurring. Either belt (110, 126), or both, may be out of adjustment or otherwise damaged or worn. Or, for example, a bearing associated with one or both may be worn. Thus, each component must be isolated by making separate adjustments and repeating testing.

An initial procedure for establishing baseline values as described above is executed. This involves initially setting both belts (110, 126) at proper tension. The baseline values take into account the angular momentum of masses associated with both the second and third pulleys (114, 122). Accordingly, after driving power has been cut off the encoder (125) and encoder timer (127) measure rotational movement of the drive shaft (116) fixed to the motor (120) for a predetermined time period. The procedure is repeated and an average is taken to establish the baseline data indicative of the time it takes for motion of the drive shaft (116) to stop after driving power shut off.

When system testing is desired, a diagnostic mode is executed and the controller (129) causes the motor (120) to operate at a predetermined, fixed velocity for a predetermined time period. At that point the power is cut and the encoder (125) and encoder timer (127) are activated to measure determine the time it takes for the motor shaft (116) to stop moving.

In the event that the timed value is greater than or less than the baseline timed value, a signal is provided to the operator through, for example, the display monitor (138). The signal indicates that either one or both of the belts (110, 126) may be improperly tensioned. Beginning with the first belt (110), using a tension gage the belt tension is properly set. The test is repeated. A timed value matching the baseline data indicates that both belts (110, 126) are now properly adjusted. If the timed value still varies from the baseline data, the second belt can be set using a tension gage. The test is then repeated again. If the timed value still varies from the baseline data, the problem may be in the pulley bearings or other components associated with the drive system. Each can be individually checked and testing can be repeated in the manner described above until timed values match baseline values.

Figure 4:
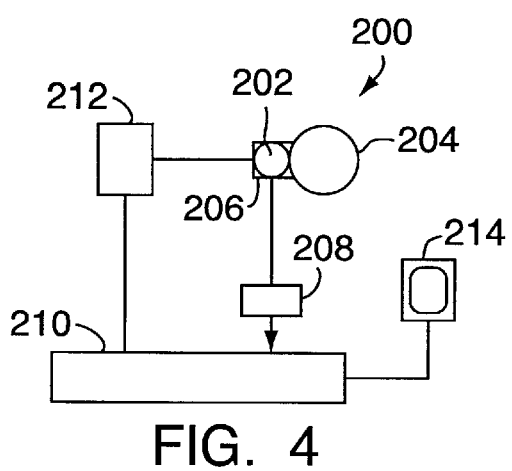
FIG. 4 is a schematic diagram of a third embodiment of a system according to the present invention.

The present invention inertia-testing method and system is not limited to belt-drive systems. For instance, it may be applied in similar fashion to a gear drive system (200) as shown in FIG. 4. In such a system (200), a drive gear (202) engaging a driven gear (204) is driven by a motor (206). An encoder and timer system (208) is interfaced with a controller (210). A drive control system (212) and display monitor (214) are also interfaced with the controller (210). The method of the present invention, as described with respect to the preceding embodiments, is carried out to detect improperly adjusted gear distances, worn teeth, improper lubrication, worn bearings and the like.

Furthermore, the present invention inertia-testing method and system is not limited to rotational drive systems or any particular type of motor. It may be applied to other types of drive systems such as linear drives and reciprocating systems, and pneumatic or gas-powered motors.

Figure 5:
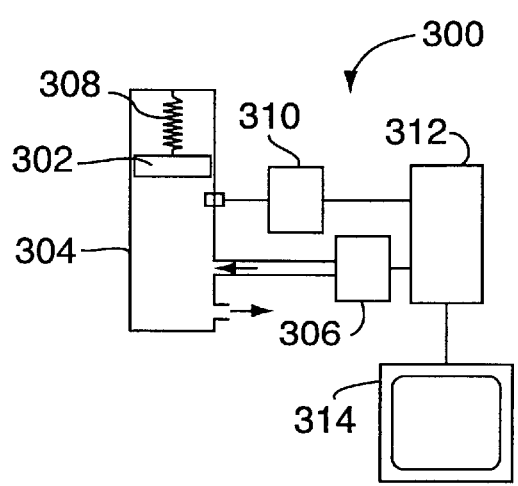
FIG. 5 is a schematic diagram of a fourth embodiment of a system according to the present invention.

Referring to FIG. 5, a pneumatic piston-cylinder system (300) includes a piston (302) adapted for reciprocal, linear movement within a cylinder (304) that is in communication with a pressurized gas source (306). A return spring (308) powers a return stroke of the piston (302). An encoder and timer system (310) and the pressurized gas source (306) are interfaced with the controller (312). A display monitor (314) is also provided.

In order to determine whether or not, for example, the return spring (308) is applying proper force, the method of the present invention, as described with respect to the preceding embodiments, is carried out. The method may be applied for testing other components such as gas pressure, seal leaks or the like.

While the preferred invention has been herein described, it is acknowledged that variation and modification may be made without departing from the scope of the presently claimed invention.

What is claimed is:

1. A method of inertia-testing a machine having at least one movable driven component, said method comprising;
    imparting a driving force to drive said driven component to drive said driven component at a predetermined rate;
    stopping said driving force;
    activating measuring means to measure test data related to movement of said driven component until said driven component stops moving;
    measuring test data until said driven component stops moving;
    comparing said test data to baseline data indicative of the condition of said driven component to determine a variance;
    signaling said variance; and
    evaluating said variance.

2. A method according to claim 1, wherein said measuring means measures the time required for said driven component to stop moving.

3. A method according to claim 1, wherein said driven component is a cyclable component; and said measuring means measures the number of cycles until said driven component stops moving.

4. A method according to claim 3, wherein said driven component is a rotatable component; and said measuring means measures the number of revolutions of said driven component until said driven component stops moving.

5. A method according to claim 1, wherein said measuring means measures the time required for said driven component to stop moving; and said measuring means measures the number of cycles of said driven component until said driven component stops moving.

6. A method of testing belt-tension in a machine having at least one driven belt, said method comprising:
    imparting a driving force to drive said belt at a predetermined rate;
    stopping said driving force;
    activating measuring means to measure test data related to movement of said belt until said belt stops moving;
    measuring test data until said belt stops moving;
    comparing said test data to baseline data indicative of the tension of said belt to determine a variance;
    signaling said variance; and
    evaluating said variance.

7. A method according to claim 6, wherein said measuring means measures the time required for said belt to stop moving.

8. A method according to claim 6, wherein said belt is a cyclable component, and said measuring means measures the number of cycles until said belt stops moving.

9. A method according to claim 8, wherein said belt is a rotatable component; and said measuring means measures the number of revolutions of said belt until the belt stops moving.

10. A method according to claim 6, wherein said measuring means measures the time required for said belt to stop moving; and said belt is a cyclable component, and said measuring means measures the number of cycles until said belt stops moving.

11. A method according to claim 6, wherein said baseline data is determined by setting the tension of said belt to a predetermined tension; imparting a driving force to drive said belt to drive said belt at a generally constant rate; stopping said driving force; activating said measuring means to measure data related to movement of said belt until said belt stops moving; measuring data until said belt stops moving; and storing said data as baseline data indicative of the tension of said belt.

12. A method according to claim 11, wherein said measuring means measures the time required for said belt to stop moving.

13. A method according to claim 11, wherein said belt is a cyclable component, and said measuring means measures the number of cycles until said belt stops moving.

14. A system for inertia-testing a machine having at least one movable driven component, said system comprising:

driving means for imparting a driving force to drive said driven component to drive said driven component at a predetermined rate having stopping means for stopping said driving force;

measuring means for measuring test data related to movement of said driven component until said driven component stops moving connected to said driving means, said measuring means having means for comparing said test data to baseline data indicative of the condition of said driven component; and signaling means connected to said measuring means for signaling the value of said test data in comparison to said baseline data.

15. A system according to claim 14, further comprising data inputting means connected to said measuring means for inputting said baseline data; and data storing means integrated within said measuring means for storing said baseline data and for storing said test data.

16. A system according to claim 14, wherein said measuring means comprises an encoder.

17. A system according to claim 14, wherein said signaling means comprises a display monitor.

18. A system for testing belt tension in a machine having at least one driven belt, said system comprising:

driving means for imparting a driving force to drive said belt at a predetermined rate having stopping means for stopping said driving force;

measuring means for measuring test data related to movement of said belt until said belt stops moving connected to said driving means; said measuring means having means for comparing said test data to baseline data indicative of the tension of said belt; and signaling means connected to said measuring means for signaling the value of said test data in comparison to said baseline data.

19. A system according to claim 18, further comprising data inputting means connected to said measuring means for inputting said baseline data; and data storing means integrated within said measuring means for storing said baseline data and for storing said test data.

20. A system according to claim 18, wherein said measuring means comprises an encoder.

21. A system according to claim 18, wherein said signaling means comprises a display monitor.

* * * * *